United States Patent
Feigenbaum

(10) Patent No.: US 6,606,646 B2
(45) Date of Patent: *Aug. 12, 2003

(54) METHODS AND APPARATUS FOR DOWNLOADING A FILE FROM A SERVER

(75) Inventor: Idan Feigenbaum, Kiryat Bialik (IL)

(73) Assignee: Speedbit Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/083,394

(22) Filed: Feb. 27, 2002

(65) Prior Publication Data

US 2002/0083133 A1 Jun. 27, 2002

Related U.S. Application Data

(63) Continuation of application No. 09/487,338, filed on Jan. 19, 2000, now Pat. No. 6,377,974.

(51) Int. Cl.$^7$ ............................................. G06F 15/16
(52) U.S. Cl. ..................... 709/203; 709/219; 709/230; 709/231; 714/18; 714/748
(58) Field of Search ................................. 709/203, 213, 709/227, 219, 230, 231, 224, 228, 218; 714/18, 4, 16, 748

(56) References Cited

U.S. PATENT DOCUMENTS

| | | | |
|---|---|---|---|
| 4,912,628 A | 3/1990 | Briggs | |
| 5,768,528 A | 6/1998 | Stumm | |
| 5,918,239 A | 6/1999 | Allen et al. | |
| 6,049,892 A | * 4/2000 | Casagrande et al. | 714/18 |
| 6,098,180 A | * 8/2000 | Kobata et al. | 714/18 |
| 6,134,584 A | 10/2000 | Chang et al. | |
| 6,138,162 A | 10/2000 | Pistriotto et al. | |
| 6,195,680 B1 | * 2/2001 | Goldszmidt et al. | 709/203 |
| 6,216,163 B1 | * 4/2001 | Bharali et al. | 709/227 |
| 6,304,909 B1 | 10/2001 | Mullaly et al. | |
| 6,339,785 B1 | * 1/2002 | Feigenbaum | 709/213 |
| 6,377,974 B1 | * 4/2002 | Feigenbaum | 709/203 |
| 6,381,709 B1 | * 4/2002 | Casagrande et al. | 714/18 |

OTHER PUBLICATIONS

World–Wide Web proxies, Ari Luotonen, Kevin Altis, 1994.*

* cited by examiner

Primary Examiner—Wellington Chin
Assistant Examiner—Chuong Ho
(74) Attorney, Agent, or Firm—Eitan, Pearl, Latzer & Cohen Zedek, LLP.

(57) ABSTRACT

A method for downloading files, the method including the steps of at a client a) requesting a proxy server to initiate a first download of a file from a first server, the first server determined by the client to lack download resume capability and the proxy server possessing download resume capability, at the proxy server b) initiating the first download of the file from the first server, and at the client c) initiating at least a second download of the file from the proxy server.

48 Claims, 2 Drawing Sheets

METHODS AND APPARATUS FOR DOWNLOADING A FILE FROM A SERVER

CROSS REFERENCE TO RELATED APPLICATIONS

This application is a continuation application of U.S. patent application Ser. No. 09/487,338, filed on Jan. 19, 2000, now U.S. Pat. No. 6,377,974, which is hereby incorporated by reference.

FIELD OF THE INVENTION

The present invention relates to computer networks in general, and more particularly to methods and apparatus for downloading a file from a server.

BACKGROUND OF THE INVENTION

Transfer protocols for downloading files from serving computers (servers) to client computers (clients) via computer networks such as the Internet are well known in the art. Two commonly used transfer protocols include the File Transfer Protocol (FTP) and the Hypertext Transfer Protocol (HTTP). Generally speaking, in order to download a file a client establishes a single data transfer link with a server during a file transfer session through which the contents of the file are transmitted from the server to the client.

Recent developments in file transfer protocols include the server's ability to begin downloading a file from a point other than the start of the file simply by instructing the server to begin transmitting the file from a specified byte offset. This server "download resume" capability has led to the development of file transfer software that is able to resume a download where the data transfer link has been terminated in the middle of a download. The download is simply continued in another file transfer session via another data transfer link with the server from the point at which the download stopped.

Unfortunately, not all servers possess download resume capability. Thus, where a download is made from such a server, should the download be prematurely terminated before the complete file is received, the download cannot be resumed frown the point of termination to retrieve the remaining portions of the file, but rather, the download must be restarted from the beginning of the file.

SUMMARY OF THE INVENTION

The present invention seeks to provide improved methods and apparatus for downloading a file from a server that does not possess download resume capability.

There is thus provided in accordance with a preferred embodiment of the present invention a method for downloading files, the method including the steps of at a client a) requesting a proxy server to initiate a first download of a file from a first server, the first server determined by the client to lack download resume capability and the proxy server possessing download resume capability, at the proxy server b) initiating the first download of the file from the first server, and at the client c) initiating at least a second download of the file from the proxy server.

Further in accordance with a preferred embodiment of the present invention the initiating step c) includes initiating a plurality of concurrent second downloads from the proxy server, where each of the plurality of second downloads is of a different portion of the file, and further including the step of assembling the different portions of the file into a single downloaded file.

Still further in accordance with a preferred embodiment of the present invention the initiating step c) includes initiating prior to the completion of the first download of the file from the first server to the proxy server.

There is also provided in accordance with a preferred embodiment of the present invention a method for downloading files, the method including at a client a) initiating a first download of a file from a first server, the first server determined by the client to lack download resume capability, b) detecting a termination of the download prior to the file being completely downloaded, c) requesting a proxy server to initiate a second download of the file from the first server, the proxy server possessing download resume capability at the proxy server d) initiating the second download of the file from the first server, at the client e) initiating at least a third download of a non-downloaded portion of the file from the proxy server, and f) assembling the portions of the file downloaded during the first and third downloads into a single downloaded file.

Further in accordance with a preferred embodiment of the present invention the initiating step e) includes initiating prior to the completion of the second download of the file from the first server to the proxy server.

It is appreciated throughout the specification and claims that references to a server not possessing download resume capability may be understood as either indicating that the server actually does not possess download resume capability or that the server, while possessing download resume capability, appears to a client as not having download resume capability, such may occur when transparent proxies are employed between the client and the server.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
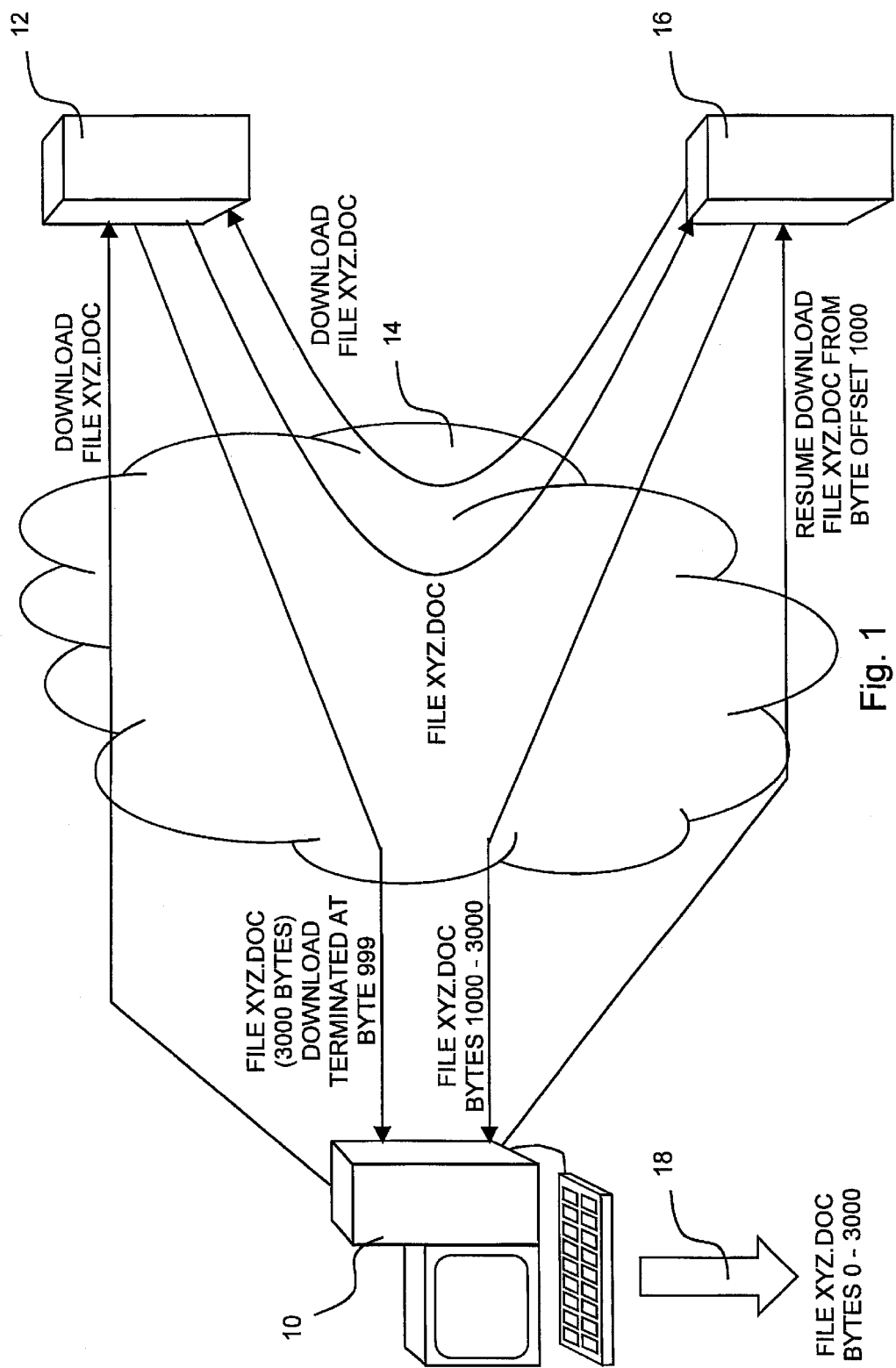
FIG. 1 is a simplified conceptual illustration of a file downloading system constructed and operative in accordance with a preferred embodiment of the present invention.

Reference is now made to FIG. 1 which is a simplified conceptual illustration of a file downloading system, constructed and operative in accordance with a preferred embodiment of the present invention. In the system of FIG. 1 a client computer 10 is provided capable of establishing a data transfer link with a server computer 12 via a network 14, such as the Internet. A proxy server 16 is also provided which is capable of establishing a data transfer link with server 12 and to which client 10 may establish one or more data transfer links. Server 12 either lacks download resume capability or is detected or otherwise perceived by client 10 in accordance with conventional protocols to lack download resume capability, while proxy server 16 possesses download resume capability.

Typical operation of the system of FIG. 1 is now described in the context of an exemplary operational scenario. In the illustration client 10 is shown requesting the download of a file XYZ.DOC from server 12, with the download commencing from byte offset 0 of XYZ.DOC. Downloading may be carried out in accordance with the File Transfer Protocol (FTP), the Hypertext Transfer Protocol (HTTP), or any other protocol known in the art. Typically, server 12 notifies client 10 of the size of the requested file, which is shown as 3,000 bytes in the illustration. The download of XYZ.DOC continues until bytes 0–999 have been downloaded to client 10, at which point the download is prematurely terminated before XYZ.DOC has been completely downloaded. The premature termination may be detected by client 10 using any known means.

After detecting the premature termination of the download, client 10 requests from proxy server 16 the portion of the file that has not yet been downloaded from server 12. The request is made of proxy server 16 and not server 12 since server 12 lacks download resume capability and would, therefore, begin downloading file XYZ.DOC from byte offset 0, thus retransmitting bytes 0–999 to client 10 unnecessarily. In response to the request from client 10, proxy server 16 downloads the file from server 12. Proxy server 16 typically has a much higher speed connection to network 14 than does client 10, enabling proxy server 16 to download the file from server 12 relatively quickly. For example, many Internet server connections transmit and receive data at rates measured in hundreds of kilobytes per second, while many client connections, such as dial-up connections, transmit and receive data at rates of less than 10 kilobytes per second. Once the portion of the file sought by client 10 has been downloaded to proxy server 16 from server 12, client 10 may continue to download the file from proxy server 16 in one or more portions beginning at byte offset 1000 and via one or more concurrent connections. Downloading from proxy server 16 to client 10 may be carried out in accordance with FTP or HTTF protocols or any other protocol known in the art, that supports the downloading of a portion of a file starting at a location determined by the requestor, often starting at a location other than the beginning of the file. Where the file is downloaded to proxy server 16 at a rate that is faster than the rate at which proxy server 16 can transmit to client 10, proxy server 16 need not wait for the entire file to be downloaded from server 12 before transmitting the requested portions of the file to client 10. Once the various portions of file XYZ.DOC are received by client 10, they may be assembled using known means into the file XYZ.DOC, as shown by reference numeral 18.

In an alternative exemplary operational scenario client 10, having detected or otherwise perceived that server 12 lacks download resume capability, does not attempt to download the file from server 12, but rather requests that proxy server 16 download the file from server 12. Client 10 may then download the file from proxy server 16 starting from byte offset 0. As described hereinabove, the download to client 10 may begin either once the entire file has been downloaded to proxy server 16 or concurrently with the download from server 12 to proxy server 16.

Figure 2:
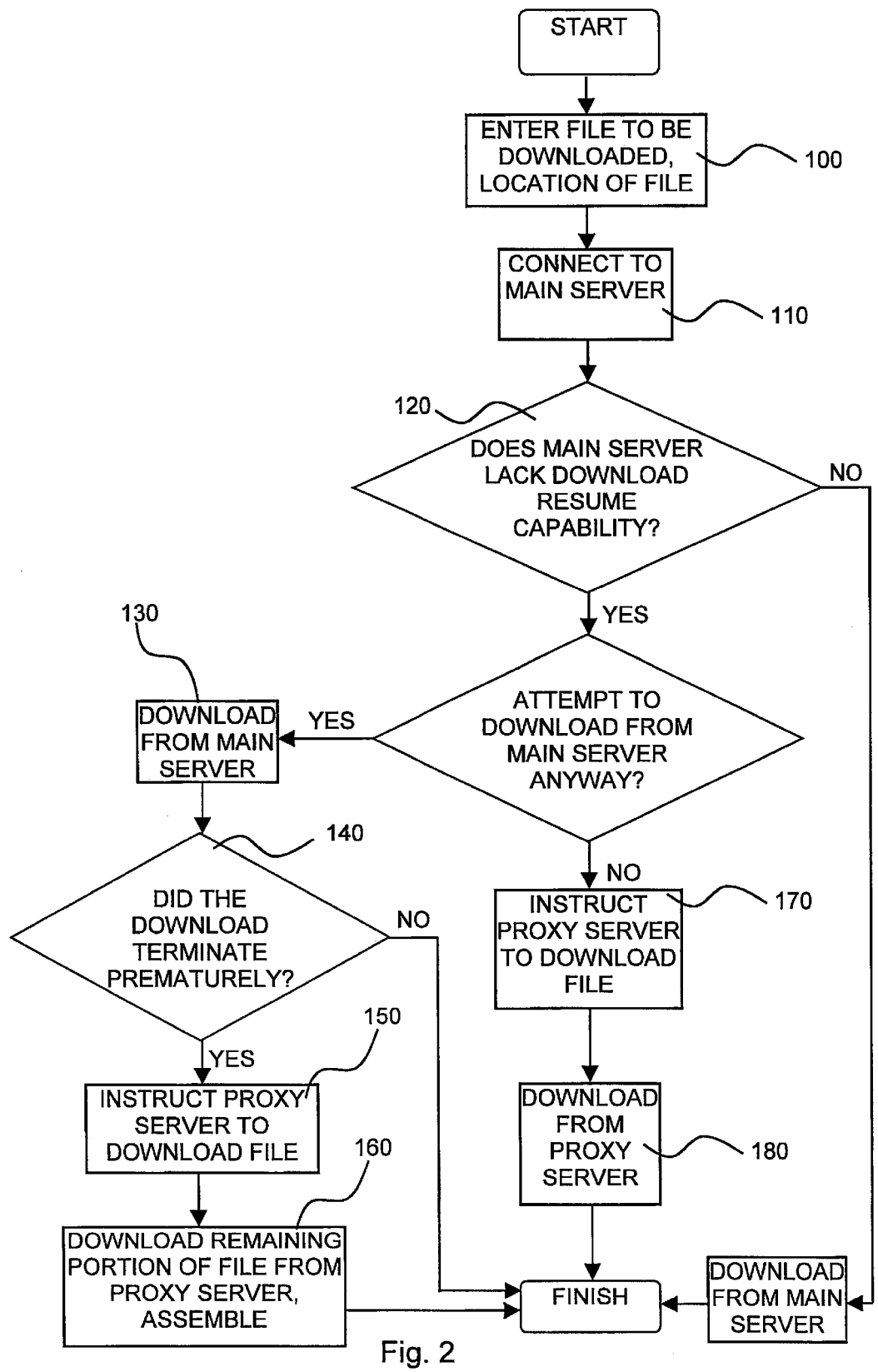
FIG. 2 is a simplified flowchart illustration of a method of operation of the system of FIG. 1, operative in accordance with a preferred embodiment of the present invention.

Reference is now made to FIG. 2 which is a simplified flowchart illustration of a method of operation of the system of FIG. 1, operative in accordance with a preferred embodiment of the present invention. Elements of the method of FIG. 2 may be implemented by client 10 and proxy server 16 using executable software, hardware, or any suitable combination thereof using conventional techniques. In the method of FIG. 2 a file to be downloaded is indicated at client 10 using any known data entry or selection technique, such as by clicking on a Hypertext Markup Language (HTML) link in a web page within a browser running on client 10 (step 100). In the embodiment of FIG. 2 the indication of the file preferably includes the location of a server on which the file may be found, namely server 12. This may be effected through the use of a Universal Resource Locator (URL) or any other location indicator known in the art. Client 10 then establishes a connection with server 12 to begin the download of the file (step 110). In accordance with any suitable conventional technique, client 10 preferably determines whether server 12 lacks or possesses download resume capability (step 120). If server 12 is found to lack download resume capability, client 10 may either attempt to download the file from server 12 anyway (step 130), or may request that proxy server 16, known to client 10 to possess download resume capability, download the file from server 12 to itself (step 170). Where client 10 attempts to download the file from server 12, if the download ends prematurely, as detected by client 10 using convention techniques (step 140), then client 10 instructs proxy server 16 to download the file from server 12 (step 150). Proxy server 16 then downloads the file from server 12, and client 10 downloads the non-downloaded portions from proxy server 16 using conventional download resume techniques, and the file is then assembled from the portions of the file downloaded to client 10 (step 160).

Where client 10 does not attempt to download the file from server 12, client 10 instructs proxy server 16 to download the file from server 12 (step 170). Proxy server 16 then downloads the file from server 12, and client 10 downloads the entire file from proxy server 16 using conventional download and download resume techniques (step 180).

While the methods and apparatus disclosed herein may or may not have been described with reference to specific hardware or software the methods and apparatus have been described in a manner sufficient to enable persons of ordinary skill in the art to readily adapt commercially available software and hardware as may be needed to reduce any of the embodiments of the present invention to practice without undue experimentation and using conventional techniques.

While the present invention has been described with reference to specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for downloading files, the method comprising:

determining that a first computer from which a file may be downloaded lacks download resume capability; and responsive to said determining, downloading at least a portion of said file from a second computer having download resume capability.

2. A method according to claim 1 and further comprising downloading said file from said first computer to said second computer.

3. A method according to claim 1 and further comprising instructing said second computer to download said file from said first computer.

4. A method according to claim 1 and further comprising instructing said second computer to download said file from said first computer in response to said determining.

5. A method according to claim 1 wherein said downloading comprises downloading a plurality of portions of said file from said second computer.

6. A method according to claim 5 and further comprising assembling said portions of said file into a single file.

7. A method according to claim 1, wherein said downloading comprises downloading a plurality of mutually exclusive portions of said file from said second computer.

8. A method according to claim 7 and further comprising assembling said portions of said file into a single file.

9. A method according to claim 2, wherein downloading at least a portion of said file comprises downloading said portion from said second computer prior to the completion of said downloading of said file from said first computer to said second computer.

10. A system for downloading files, the system comprising:
- a first computer from which a file may be downloaded and lacking download resume capability;
- a second computer having download resume capability; and
- a third computer operative to:
  - determine that said first computer lacks download resume capability; and
  - responsive to said determination, download at least a portion of said file from said second computer.

11. A system according to claim 10, wherein said second computer is operative to download said file from said first computer.

12. A system according to claim 10, wherein said third computer is operative to instruct said second computer to download said file from said first computer.

13. A system according to claim 10, wherein said third computer is operative to instruct said second computer to download said file from said first computer in response to determining that said first computer lacks download resume capability.

14. A system according to claim 10, wherein said third computer is operative to download a plurality of portions of said file from said second computer.

15. A system according to claim 14, wherein said third computer is operative to assemble said portions of said file into a single file.

16. A system according to claim 10, wherein said third computer is operative to download a plurality of mutually exclusive portions of said file from said second computer.

17. A system according to claim 16, wherein said third computer is operative to assemble said portions of said file into a single file.

18. A system according to claim 11, wherein said third computer is operative to download said portion from said second computer prior to completion of said download of said file from said first computer to said second computer.

19. A computer program embodied on a computer-readable medium, the computer program comprising:
- a first code segment operative to determine that a first computer from which a file may be downloaded lacks download resume capability; and
- a second code segment operative in response to determining that said first computer lacks download resume capability, to download at least a portion of said file from a second computer having download, resume capability.

20. A computer program according to claim 19 and further comprising a third code segment operative to instruct said second computer to download said file from said first computer.

21. A computer program according to claim 19 and further comprising a third code segment operative to instruct said second computer to download said file from said first computer in response to determining that said first computer lacks download resume capability.

22. A computer program according to claim 19, wherein said second code segment is operative to download a plurality of portions of said file from said second computer.

23. A computer program according to claim 22 and further comprising a third code segment operative to assemble said portions of said file into a single file.

24. A computer program according to claim 19, wherein said second code segment is operative to download a plurality of mutually exclusive portions of said file from said second computer.

25. A computer program according to claim 24 and further comprising a third code segment operative to assemble said portions of said file into a single file.

26. A computer program according to claim 20, wherein said second code segment is operative to download said portion from said second computer prior to completion of said download of said file from said first computer to said second computer.

27. A computer program embodied on a computer-readable medium, the computer program comprising:
- a first code segment operative to determine that a first computer from which a file may be downloaded lacks download resume capability; and
- a second code segment operative in response to determining that said first computer lacks download resume capability, to instruct a second computer to download said file from said first computer; and
- a third code segment operative to download at least a portion of said file from said second computer having download resume capability.

28. A computer program embodied on a computer-readable medium, the computer program comprising:
- a first code segment operative to determine that a first computer from which a file may be downloaded lacks download resume capability;
- a second code segment operative in response to determining that said first computer lacks download resume capability, to instruct a second computer to download said file from said first computer; and
- a third code segment operative to download at least a portion of said file from said second computer having download resume capability prior to completion of said download of said file from said first computer.

29. A first computer operative to determine that a second computer from which a file may be downloaded lacks download resume capability, and in response to said determination, to download at least a portion of said file from a third computer having download resume capability.

30. A first computer according to claim 29, wherein said first computer is operative to download a plurality of portions of said file from said third computer.

31. A first computer according to claim 30, wherein said first computer is operative to assemble said portions of said file into a single file.

32. A first computer according to claim 29, wherein said first computer is operative to download a plurality of mutually exclusive portions of said file from said third computer.

33. A first computer according to claim 32, wherein said first computer is operative to assemble said portions of said file into a single file.

34. A method for operating a server, said method comprising:
- upon receipt of an instruction from a first computer, said first computer having determined that a second computer from which a file may be downloaded lacks download resume capability, transmitting at least a portion of said file to said first computer, wherein said server has download resume capability.

35. A method according to claim 34 and further comprising downloading said file from said second computer.

36. A method according to claim 34, wherein said transmitting comprises transmitting a plurality of portions of said file to said first computer.

37. A method according to claim 34, wherein said transmitting comprises transmitting a plurality of mutually exclusive portions of said file to said first computer.

38. A method according to claim 35, wherein transmitting at least a portion of said file to said first computer occurs prior to completion of said downloading of said file from said second computer.

39. A method for operating a server, said method comprising:
   upon receipt of an instruction from a first computer, said first computer having determined that a second computer from which a file may be downloaded lacks download resume capability, downloading said file from said second computer, wherein said server has download resume capability; and
   transmitting at least a portion of said file to said first computer.

40. A method for operating a server, said method comprising:
   upon receipt of an instruction from a first computer, said first computer having determined that a second computer from which a file may be downloaded lacks download resume capability, downloading said file from said second computer, wherein said server has download resume capability; and
   transmitting at least a portion of said file to said first computer prior to completion of downloading said file from said second computer.

41. A first computer having download resume capability and operative to, upon receiving an instruction from a second computer, said second computer having determined that a third computer from which a file may be downloaded lacks download resume capability, transmit at least a portion of said file to said second computer.

42. A first computer according to claim 41, wherein said first computer is operative to download said file from said third computer.

43. A first computer according to claim 41, wherein said first computer is operative to transmit a plurality of portions of said file to said second computer.

44. A first computer according to claim 41, wherein said first computer is operative to transmit a plurality of mutually exclusive portions of said file to said second computer.

45. A first computer according to claim 42, wherein said first computer is operative to transmit said portion to said second computer prior to completion of said download of said file from said third computer to said first computer.

46. A first computer having download resume capability and operative to, upon receiving an instruction from a second computer, said second computer having determined that a third computer from which a file may be downloaded lacks download resume capability, download said file from said third computer and transmit at least a portion of said file to said second computer.

47. A first computer having download resume capability and operative to, upon receiving an instruction from a second computer, said second computer having determined that a third computer from which a file may be downloaded lacks download resume capability, download said file from said third computer and transmit at least a portion of said file to said second computer prior to completion of said download of said file from said third computer to said first computer.

48. Apparatus for downloading files, the apparatus comprising:
   means for determining that a first computer from which a file may be downloaded lacks download resume capability; and
   means for downloading at least a portion of said file from a second computer in response to said determining.

* * * * *